United States Patent [19]

Goldenberg et al.

[11] Patent Number: 4,734,475
[45] Date of Patent: Mar. 29, 1988

[54] WETTABLE SURFACE MODIFIED CONTACT LENS FABRICATED FROM AN OXIRANE CONTAINING HYDROPHOBIC POLYMER

[75] Inventors: Merrill Goldenberg, Teaneck, N.J.; Karl F. Mueller, New York, N.Y.

[73] Assignee: Ciba-Geigy Corporation, Ardsley, N.Y.

[21] Appl. No.: 941,906

[22] Filed: Dec. 15, 1986

[51] Int. Cl.$^4$ ............................................. C08F 24/00
[52] U.S. Cl. .................................. 526/273; 525/326.5; 525/327.3
[58] Field of Search ................... 526/273; 525/327.3, 525/326.5

[56] References Cited

U.S. PATENT DOCUMENTS

| | | | |
|---|---|---|---|
| 2,949,445 | 8/1960 | Blake | 525/327.3 |
| 3,758,448 | 9/1973 | Stamberger | 260/86.1 E |
| 3,772,235 | 11/1973 | Stamberger | 260/29.6 HN |
| 3,778,264 | 12/1973 | Arai et al. | 525/327.3 |
| 3,787,380 | 1/1974 | Stamberger | 260/80.72 |
| 3,947,401 | 3/1976 | Stamberger | 260/29.6 H |
| 3,952,178 | 4/1976 | Reese et al. | 200/47 |
| 3,954,898 | 5/1976 | Hirota et al. | 525/327.3 |
| 4,042,645 | 8/1977 | Hirota et al. | 525/327.3 |
| 4,055,378 | 10/1977 | Feneberg et al. | 351/160 |
| 4,062,627 | 12/1977 | Wajs et al. | 351/160 |
| 4,094,831 | 6/1978 | Sandstrom | 525/327.3 |
| 4,099,859 | 7/1978 | Merrill | 351/160 |
| 4,128,318 | 12/1978 | Sieglaff et al. | 351/160 R |
| 4,131,696 | 12/1978 | Covington | 427/164 |
| 4,139,660 | 2/1979 | Tur | 427/353 |
| 4,169,119 | 9/1979 | Covington | 264/1 |
| 4,180,308 | 12/1979 | Mancini et al. | 526/273 |
| 4,182,723 | 1/1980 | Covington | 525/26 |
| 4,182,725 | 1/1980 | Floyd et al. | 260/45.85 |
| 4,338,419 | 7/1982 | Korb et al. | 525/350 |
| 4,649,184 | 3/1987 | Yoshikawa et al. | 526/279 |

FOREIGN PATENT DOCUMENTS

| | | | |
|---|---|---|---|
| 47-29482 | 11/1972 | Japan | 525/327.3 |
| 47-51836 | 12/1972 | Japan | 525/327.3 |
| 55-145745 | 11/1980 | Japan | 525/327.3 |
| 398567 | 9/1973 | U.S.S.R. | 525/327.3 |

OTHER PUBLICATIONS

CA 96:168782n, (1982) of French 2,483,310.
CA 95: 86338n, (1981) of Canadian 1,099,546.

Primary Examiner—Joseph L. Schofer
Assistant Examiner—N. Sarofim
Attorney, Agent, or Firm—Michael W. Glynn; Irving M. Fishman

[57] ABSTRACT

A contact lens possessing a wettable surface in its aqueous environment of use fabricated from a hydrophobic addition polymer incorporating between about 0.5 and about 30% weight oxirane substituted units in the backbone thereof, wherein the outer surfaces of said lens contain an effective hydrophilic inducing amount of a reaction product of said oxirane substituted units of the formula

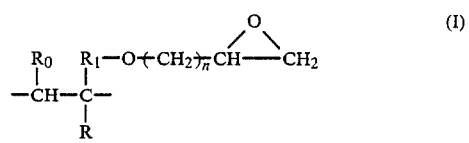 (I)

wherein
R is hydrogen or methyl;
R$_1$ is

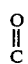

or lower alkylene;
n is 1 to 4; and
R$_0$ is hydrogen or

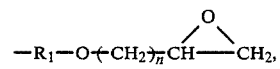

with a water soluble reactive organic amine, alcohol, thiol, urea or thiourea or a sulfite, bisulfite or thiosulfate, and the use thereof by placement in the eye of a patient in need of the same to correct vision defects of a refractive nature.

9 Claims, No Drawings

WETTABLE SURFACE MODIFIED CONTACT LENS FABRICATED FROM AN OXIRANE CONTAINING HYDROPHOBIC POLYMER

BACKGROUND OF THE INVENTION

Contact lenses are commonly placed into two categories, soft lenses and hard lenses. Soft lenses are rubbery and pliable, and they are fitted so as to closely match the shape of the cornea. Because of their softness they are more comfortable for the wearer than are hard lenses and because of their tight fit they have to be oxygen permeable in an amount sufficient to meet the needs of the cornea if worn for extended periods.

Hard lenses on the other hand have to possess excellent dimensional stability and are fitted so as to sit on the cornea only with the center of the lens, leaving enough space between their edges and the eye to allow good tear liquid exchange and thereby oxygen supply to the cornea. Although hard lenses are less comfortable to wear, they can be fabricated with greater precision and are preferred to correct, for instance, astigmatism. For both types of lenses excellent wettability by the tear liquid is important. This is especially true for soft lenses; soft lenses which cannot freely rotate on the eye and which are not easily wettable can become stuck to the cornea—which also is hydrophobic—and difficult to remove, sometimes only with injury to the eye, due to the suction-cup effect. For this reason commercially successful soft lenses are primarily of the hydrogel type, most commonly made from poly(2-hydroxyethyl methacrylate, HEMA), from HEMA copolymers, or from vinylpyrrolidone copolymers. These contact lenses generally contain from 38–75% water and thus water content is primarily responsible for their softness, their oxygen permeability (DK) of about 8 to about 30 barrers and their good physiological response.

On the negative side, the high water content makes a rather weak polymer, and oxygen permeability cannot therefore be further increased by raising water content or cutting thinner lenses. Oxygen permeability of 20–50 barrers for hard lenses and up to 100 barrers for soft lenses are desirable and required for extended wear contact lenses. In addition, hydrogel contact lenses have to be regularly sterilized.

These drawbacks could be overcome if silicone rubber could be used as contact lens material; it is strong, comfortably soft and polysiloxane is the polymer with one of the highest known oxygen permeability. Unfortunately polysiloxane is also very hydrophobic and imparts this hydrophobicity to polymers which contain a substantial amount of it. This hydrophobic character also leads to excessive deposition of protein and/or lipids on a contact-lens surface.

A number of methods have been used to make polymethylmethacrylate (PMMA) and polysiloxane based contact lenses more wettable. U.S. Pat. No. 4,131,696 describes the treatment of PMMA contact lenses with aqueous, colloidal suspensions of inorganic hydroxides. Plasma-treatment in a glow discharge chamber using water, hydrazine, ammonia, formamide, ethylene diamine and similar compounds is used to hydrophilize PMMA and silicone rubber and is described in U.S. Pat. No. 3,952,178. A similar process using gases such as oxygen, nitrogen, $NO_2$, $N_2O$, $N_2O_3$, NO, $SO_2$ and CO is described in FR No. 2,483,310. U.S. Pat. No. 4,139,660 describes the treatment of hydrophobic surfaces with halides of elements from group IV of the Periodic Table, followed by an aqueous rinse. U.S. Pat. No. 4,055,378 describes a treatment by activated oxygen ions of an $SiO_2$-filled silicone lens, by which the $SiO_2$ filler becomes exposed to the surface and/or organic silicone groups are oxidized to $SiO_2$ to thereby render the surface more wettable. U.S. Pat. No. 4,062,627 and U.S. Pat. No. 4,099,859 describe free-radical initiated grafting reactions of N-vinylpyrrolidone or hydroxyalkyl(meth)acrylates on the surfaces of silicone rubber contact lenses.

Every one of these methods suffers from one or several drawbacks. For example, plasma treatments and oxidizing treatments of PMMA and silicone surfaces produce only very thin modified surface regions and therefore these treatments do not provide sufficiently permanent wettability. If the effect wears off, it can only be restored by a new and expensive repetition of the original treatment. Grafting methods involve the use of a swelling monomer on a precision-cut contact lens, which can easily lead to permanent distortions of its optical properties. In addition, by the very nature of free-radical initiated grafting reactions quality control is very difficult and the whole process is cumbersome. The grafting polymerization must be conducted at temperature levels and periods of time under which the vinyl monomer is capable of diffusing into and swelling previously grafted polymer chains, thereby producing irregular regions of proliferating grafting by a positive feedback effect. In other words, after the very first grafting to the hydrophilic silicone surface has been accomplished the new surface is much more absorptive to the monomer. The monomer is thermodynamically compelled to swell the grafted hydrophilic polymer and further irradiation will produce additional grafting in regions already reached in the polymer. Thus, the process is one of positive feedback and can lead to gross differences in amount of grafted hydrophilic polymer per unit area to silicone substrate. Upon subsequent immersion in water the more grafted regions swell to the greater degree, thereby potentially distorting the interface and producing undesirable optical dispersion.

It has now unexpectedly been discovered that if glycidyl groups containing contact lenses are treated under mild aqueous conditions with a variety of primary or secondary amines, thiols, thiourea, sulfite or thiosulfate, a permanently wettable surface is obtained without impairing the clarity or the optical quality of the lens. It is a further advantage of the process of this invention that it is exceedingly simple and very easy to control and, should the effect ever wear off, very safely and easily repeated by the wearer of the lens at home. It is a further objective of this invention to use the described surface-treatment of glycidyl groups containing contact lenses during the routine contact lens cleaning procedures carried out by the contact lens wearer. We speculate that the high quality and distortion-free nature of the final contact lens is a result of the single-step nature of the reaction. Step-reactions, of which polycondensation is a prime example, are much easier to control than are chain-reactions, where a very rapid growth reaction generally leads unpredictably to very high molecular weights. Single-step reactions also assure excellent compatibility of the treated surface with the underlying bulk polymer whereas the high molecular weight of free-radical grafted chains leads to phase separation and thereby optical haziness.

Glycidyl acrylate and glycidyl methacrylate as components of silicone-free hydrogel contact lenses have been specifically described in U.S. Pat. Nos. 3,787,380, 3,758,448, 3,772,235, 3,947,401; in several other patents it is disclosed as a possible component of the monomer mixture. In all instances the purpose of using this monomer is to influence water uptake and crosslinking reactions. U.S. Pat. Nos. 4,182,725, 4,182,723 and 4,169,119 describe silicone rubber lenses made wettable by inclusion of small amounts of glycidyl(meth)acrylate polymers, without additional surface treatment. Although an increase in wettability has been shown in these patents, this increase is insufficient to fulfill the requirements of a silicone-based soft contact lens having a surface of sufficient wettability to provide for adequate patient comfort.

In Canadian Pat. No. 1,099,546 glycidyl methacrylate is used as part of a hydrogel-contact lens formulation to introduce rigidity.

U.S. Pat. No. 4,338,419, in relevant part, discloses the complete removal of residual uncrosslinked oxirane units present as a minor impurity in a crosslinked hydrophilic hydrogel material formed of a polymerized co-monomer mixture initially containing not more than 5% oxirane monomer as a crosslinking agent, and exemplifying less than 1% by weight thereof in the initial monomer mixture, by reaction with a thiol. No increase in the hydrophilicity of the surface of the lens materials is reported.

It is an object of the present invention, in clear contradistinction to the prior art, to provide normally hydrophobic oxirane containing contact lenses with a substantially increased hydrophilic surface, i.e. to increase the wettability thereof, by incorporating a hydrophilic inducing amount of a water soluble organic amine, alcohol, thiol, urea or thiourea, or a sulfite, bisulfite or thiosulfate - oxirane reaction product on the surfaces of such lens.

It is a further object of the present invention to provide a method to correcting vision defects of a refractive nature by placing in the eye of a patient in need of the same, a contact lens made of such material containing the aforementioned surface modification.

These and other objects of the instant invention are more fully set forth in the following detailed description.

DETAILED DESCRIPTION OF THE INVENTION

One embodiment of the present invention relates to a contact lens possessing a wettable surface in its ocular aqueous environment of use fabricated from a hydrophobic addition polymer incorporating between about 0.5 and about 30% by weight oxirane substituted units in the backbone thereof, wherein the outer surfaces of said lens contain an effective hydrophilic inducing amount of a reaction product of said oxirane substituted units of the formula

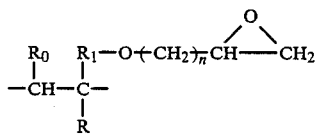
(I)

wherein
R is hydrogen or methyl;

$R_1$ is

or lower alkylene;
n is 1 to 4; and
$R_0$ is hydrogen or

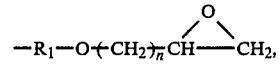

with a water soluble organic amine, alcohol, thiol, urea or thiourea, or a sulfite, bisulfite or thiosulfate.

By hydrophobic addition polymers is meant that class of addition polymers which exhibits a contact angle by the captive bubble technique of less than about 150°, preferably less than about 145°, most preferably, less than about 140°.

Alternatively, the hydrophobicity of such addition polymers can be characterized in terms of the wettability of the polymer surface, generally expressed as the rate at which a water film on the surface of the polymer retracts or beads up. Thus, in the context of the present invention, useful oxirane containing hydrophobic addition polymers are those wherein a sample, having a vertical length of 40 mm, a width of 20 mm and a thickness of 1 mm is vertically removed from distilled water and the water film retracts, or beads up, at a rate such that about 90% of the surface is visually water free in less than about three seconds, preferably about two seconds or less.

By a hydrophilic inducing amount of the aforementioned reaction product of water soluble organic amine, alcohol, thiol, urea or thiourea, or a sulfite, bisulfite or thiosulfate with the oxirane containing units of formula I is meant an amount sufficient to increase the contact angle, as measured by the captive bubble technique by at least 5°, more preferably at least 10°, most preferably at least 15°.

In terms of wettability, as defined in accordance with the retraction time of a 40-mm by 20-mm by 1-mm sample, a hydrophilic inducing amount can be characterized as an amount sufficient to increase the 90% retraction time of water to greater than about 5 seconds, preferably greater than about 10 seconds.

Hydrophobic addition polymers containing units of formula I are known, per se, or can be manufactured by polymerization techniques well known in the art, by copolymerizing between about 0.5 and about 30 percent by weight of an oxirane containing monomer of the formula

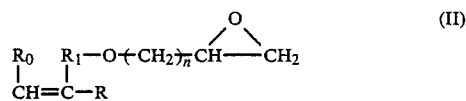
(II)

with about 99.5 to about 70 percent by weight of one or more conventional mono- or polyvinylic comonomers employed in the contact lens field.

Suitable comonomers include alkyl acrylates and methacrylates, especially $C_1$-$C_{20}$ alkyl acrylates and $C_1$-$C_{20}$ alkyl methacrylates, such as methyl methacrylate, ethyl methacrylate, methyl acrylate, butyl methacrylate, butyl acrylate, 2-ethylhexyl acrylate, and the like; alkanoic vinyl esters, especially $C_1$–$C_6$ alkanoic vinyl esters such as vinyl acetate, vinyl butyrate and the like; alkenes, especially $C_2$–$C_8$ alkenes, including ethylene, 1-butene, 1-hexene, and the like; styrenes, especially styrene and alpha-methyl styrene; vinyl ethers, especially $C_1$–$C_6$ alkyl vinyl ethers, including methyl vinyl ether, ethyl vinyl ether and butyl vinyl ether, and the like; dialkyl maleates, fumarates or itaconates, especially $C_1$–$C_6$ dialkyl maleates, fumarates or itaconates, including dimethyl maleate, dimethyl fumarate, diethyl maleate, dimethyl itaconate and the like; allyl ethers and esters, especially allyl $C_1$–$C_6$ alkyl ethers and allyl $C_2$–$C_6$ alkanoate esters, including allyl methyl ether, allyl ethyl ether, allyl acetate and the like; perfluoro $C_3$–$C_6$ alkyl acrylates or methacrylates; perfluoroalkoxylated bis-acrylates or -methacrylates; poly- or oligoalkylsiloxane acrylates or methacrylates, and the like.

Also, minor amounts of a crosslinking agent, to increase hardness, stability and the mechanical characteristics of the polymer are generally employed. Suitable crosslinking agents include, for example, $C_2$–$C_6$ alkylene ether di-methacrylates and acrylates, e.g. ethylene glycol dimethacrylate, diethylene glycol dimethacrylate, triethylene glycol dimethacrylate, glycerine trimethacrylate; allyl acrylate or methacrylate, divinyl benzene, poly- or oligo-alkylsiloxane di-acrylate or -methacrylate, and the like.

Also, as a minor constituent, there may be present one or more conventional hydrophilic monomers. The amount of such hydrophilic monomers will, for the purposes of this invention, be less than the amount needed to raise the aforementiond contact angle of the polymer to greater than about 150°, preferably less than 145°, most preferably less than about 140°, and in an amount insufficient to retard the 90% retraction time to greater than about three seconds, preferably insufficient to retard the 90% retraction time to greater than about two seconds or less. Suitable hydrophilic monomers include those conventional monomers employed in the contact lens field include hydroxylated $C_2$–$C_6$ alkyl acrylates and methacrylates, including 2-hydroxyethyl methacrylate, 2-hydroxyethyl acrylate, 2,3-dihydroxypropyl acrylate, and 2,3-dihydroxypropyl methacrylate; N-vinyl lactams, including N-vinyl pyrrolidone; acrylamide; $C_1$–$C_2$ alkyl acrylamides, such as methyl acrylamide or dimethyl acrylamide; and the like.

Preferably, the hydrophobic addition polymer is an addition polymer containing from about 1 to about 20 weight percent of the units of formula I, i.e. formulated from a corresponding amount of the monomer of formula II. Most preferably, the polymer contains from about 5 to about 12 weight percent of the units of formula I.

Preferred comonomers are $C_1$–$C_6$ acrylates and methacrylates, including methyl methacrylate, butyl acrylate, 2-ethylhexyl acrylate, and the like; ethylene glycol dimethacrylate; and poly- or oligo-alkylsiloxane mono- or bi-acrylates or methacrylates; or mixtures thereof.

Preferred monomers of formula II include glycidyl acrylate, glycidyl methacrylate and allyl glycidyl ether. Most preferred is glycidyl methacrylate.

The polymer can be obtained from the monomer mixture by methods known per se. Thus, the monomer mixture can be polymerized at a temperature between about 0° C. to about 100° C., in the optional presence of a free radical catalyst and/or in the presence of actinic radiation, such as UV radiation.

The polymer may be cast in the form of a contact lens by the use of a conventional mold, or by spin casting polymerization techniques or may be cast as a rod, or as buttons which are then machined into the desired shape of a contact lens.

For example, contact lenses suitable for carrying out surface reactions can be made by either molding or casting, or by machining from clear polymers containing about 0.5 to about 30 weight percent of units of formula I in the polymer backbone. They can be hard contact lens materials as exemplified by polymethylmethacrylate (PMMA), such as PMMA copolymers with glycidyl methacrylate; or they can be silicone containing hard lenses, which contain in addition to PMMA or other hard (meth)-acrylic polymers oxygen-permeable poly- or oligosiloxane units, and which are for instance described in U.S. Pat. Nos. 3,808,178; 4,120,570; 4,139,513; 4,152,508; 4,189,546; and 4,157,508. Since glycidyl methacrylate is a monomer which imparts high hardness to an acrylic copolymer, its use as an additional comonomer in the compositions covered in these patents does not negatively influence their properties.

Another class of contact lenses especially useful for this invention are silicone containing lenses, such as hydrophobic, silicone containing lenses, as for instance disclosed in U.S. Pat. Nos. 4,182,725 or 4,245,069.

Inclusion of about 0.5 to about 30 weight percent glycidyl methacrylate into the above disclosed polymer compositions gives lenses which can be modified in the manner described hereinafter.

Most preferred silicone contact lens materials are:

Hydrophobic, silicone containing copolymers of 1–30% glycidyl (meth)acrylate, 50–90% of the reaction product of a diisocyanate capped polydimethylsiloxanylalkyl-polyol of a MW from 800–5000 with 2-hydroxyethyl (meth)acrylate, or N-tertbutylaminoethyl methacrylate, or of said polydimethylsiloxane polyol with 2-isocyanatoethyl methacrylate, and 0–40% of a $C_1$–$C_{20}$ alkyl (meth)acrylate.

The reactive compounds may be a water soluble aliphatic, cycloaliphatic or aromatic primary, secondary or tertiary amine or polyamine, especially those having up to 12 carbon atoms, and preferably amines which contain an additional functional group as part of the molecule, such as a conventional hydrophilic moiety, or several such moieties. Primary and secondary amines are the preferred compounds.

Conventional hydrophilic moieties which may be present as substituents include, for example, hydroxy, amido, polyethoxy, lower alkoxy, carboxy, sulfato, sulfonamido, sulfo, phosphato, phosphonato, and the like. Preferred polyethoxy groups include polyethyleneoxy of 2 to 100 units.

Other reactive compounds are water soluble sulfite, bisulfite and thiosulfate salts, water soluble mono- or dithiols, either aliphatic or aromatic in nature, and preferably water soluble thiols of up to 12 carbon atoms optionally containing one or more hydrophilic substituents, e.g. as enumerated in the preceding paragraph.

Exemplary of suitable water soluble compounds are:
methylamine, dimethylamine, ethylamine, isopropylamine, diisopropylamine, poly(ethyleneimine), 2-aminopropylether, polyethylene or polypropylene oxide diamine (Jeffamine) and those in which the amine is contained in a ring such as pyrrolidine, piperidine, piperazine, morpholine, thiomorpholine, ethylenediamine, bis-aminopropylpiperazine, aniline, p-methoxyethoxybenzylamine, aminoethanol, diethanolamine, n-propanolamine, di-n-propanolamine, isopropanolamine, diisopropanolamine and other lower branched alkanols which can be polyhydroxy such as 2-amino-2-methyl-1-propanol, tris(hydroxymethyl)aminomethane, 1,3 bis [tris(hydroxymethyl)methylamino]propane, N-(3-aminopropyl)diethanol, D-glucosamine, N-methyl-D-glucamine, N-(β-hydroxyethyl)piperazine, 2-piperidineethanol, p-aminophenol, aminocresol, aminobenzylalcohol, glycine, serine, aspartic acid, sarcosine, tyrosine, tricine, 3-aminobutyric acid, 6-aminohexanoic acid, 4-amino-3-hydroxybutyric acid, 2-aminoethanesulfonic acid, N-methyltaurine, 2-aminoethyl hydrogen sulfate, N-(2-acetamido)-2-aminoethanesulfonic acid, aminobenzoic acid, p-aminocinnamic acid, 4-amino-3-hydroxy-1-naphthalene sulfonic acid, aminosalicylic acid, 6-amino-m-toluenesulfonic acid, 3-amino-L-tyrosine dihydrochloride, purines, pyrimidines, adenine, 2-aminopurine, cytosine, thymine, uracil, adenosine, cytidine, guanosine, deoxyadenosine, thymidine, adenylic acid, adenosine triphosphate, thymidylic acid, deoxycetidine diphosphate, thymidinediphosphate, aminopyridines, imidazole, 2-aminoimidazole, oxazole, thiazole, (4-aminobutyl)-guanidine, S-(2-aminoethyl)isothiouronium hydrobromide, 3-aminocrotonamide, phosphatidylethanolamines, and the like.

Preferred water soluble thiols include:

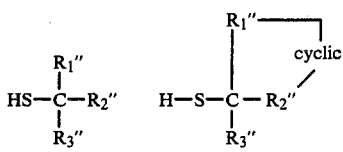

$R_1''$=H or $R_4''$ and $R_2''$=H or $R_5''$ where $R_4''$, $R_5''$ and $R_3''$ are independently straight or branched chain alkyl, cycloalkyl, aryl, aralkyl, alkaryl up to 12 carbon atoms which may be unsaturations or interrupted by heteroatoms such as oxa, imino or the like, or $R_1''$ and $R_2''$ together is an aliphatic divalent radical of up to 6 carbon atoms, and $R_4''$, $R_5''$ and $R_3''$ may be unsubstituted or be substituted with one or more of the aforementioned hydrophilic substituents.

Useful preferred compounds include water soluble amines of the general structure:

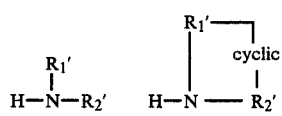

wherein $R_1'$=H or $R_3''$ where $R_3'$ and $R_2'$ may be independently a straight or branched chain alkyl, aralkyl, alkaryl, aryl or cycloalkyl of up to 12 carbon atoms that may include unsaturation or be interrupted by heteroatoms such as oxa, imino and the like, or $R_1'$ and $R_2'$ together form a divalent aliphatic radical of up to 6 carbon atoms which is unsubstituted or substituted by one or more hydrophilic groups. $R_3'$ or $R'_2$ can also together represent a heterocyclic moiety. Suitable hydrophilic groups are those recited above.

Exemplary of suitable water soluble thiols are:
ethanethiol, 1,4-butanedithiol, 2-mercaptoethylether, pentaerythretoltetrathiopropionate and acetate; polyethyleneglycoldimercaptoacetate and methylthioglycolate, allyl mercaptan, 2-mercaptoethanol, 3-mercaptopropanol, 4-mercaptobutanol, 1-thioglycerol, thioerythritol, 2,3-dimercaptopropanol, pentaerythretolmono (di; tri)thiopropionate or acetate, thioglycolic acid, thioacetic acids, 3-mercaptopropionic acid, thiolactic acid, thiomalic acid, thiosuccinic acid, thiosalicylic acid, thiobenzoic acid and their respective water soluble salts, glutathione, furfuryl mercaptan, 2-mercaptobenzimidazole, 2-mercaptobenzoxazole, 2-mercapto-3-pyridinol, dimethylaminopropanethiol, 2-mercaptoethylamine, 2-n-butylaminoethanethiol, and the like.

Also, especially preferred are the water soluble salts of sulfite, bisulfite and thiosulfate, especially the pharmaceutically acceptable salts thereof.

Exemplary of suitable water soluble ureas and thiouras are:

urea, methylurea, ethylurea, butylurea, hydantoin, 5-hydantoinacetic acid, 2-amino-3-ureido-propionic acid, diureidoacetic acid, pyrimidinetetrone, 6-amino-1,3-dimethyluracil, 5-aminoorotic acid, 2-amino-5-ureidovaleric acid, 2-imidazolidinone; thiourea, 1-methyl-2-thiourea, 5-methyl-2-thiouracil,2-imidazolidinethione, and the like.

Exemplary of suitable water soluble alcohols are:
methanol, ethanol, glycol, glycerol, polyvinyl alcohol, polyethylene glycol, dextrose, glucose, mannose, fructose, sorbitol, maltose, dextran, dextrin, agarose, gum arabic, phenol, acetamidophenol, pyrogallol, resorcinol, and the like.

The reaction can be carried out in any liquid medium which is a solvent for the reactant but is preferably an aqueous medium, consisting of water or water-solvent mixtures. The addition of solvent to the reaction medium is sometimes necessary to ensure penetration of the reactant into the substrate, especially if this substrate is hard and hydrophobic. Solvents may also be required to solubilize otherwise insoluble reactants. It is in some applications such as contact lenses desirable to cause as little swelling of the substrate as possible during the reaction in order to avoid later optical distortion.

In many cases it is also advisable to use a buffered aqueous solution to insure reproducibility and avoid unfavorably high or low pH range. Preferably the reaction is carried out at a pH between 3 and 10, more preferably between 7 and 9. Since at the very low pH necessary to effect reaction between glycidyl groups and tertiary amines, hydrolysis of the glycidyl group occurs also, tertiary amines are generally unsuited to prepare the products of this invention. Any of the commonly used buffers can be used as long as they do not interfere with the reaction, for instance phosphates, borate, citrates. Some reactants, such as TRIS (trihydroxymethylaminomethane) are themselves buffers.

The reaction temperature can vary over a wide range, typically it is between 0° and 100° C., preferably between 20° and 60° C., most preferable between 25° and 35° C. The reaction time can also vary as a matter of choice of reaction temperature and reactant concentration. Dependent on substrate and reactant, reaction times from 1 minute to 1 day are useful and most commonly they range from 10 minutes to 5 hours.

Reactant concentrations can vary from 0.1% to 100%, preferably they range from 5% to 50%, most preferable they are between 10 and 30%.

When the reaction is carried out in primarily aqueous or in organic medium with hydrophobic contact lenses, especially silicone containing materials, the reaction and resulting modification can be restricted to a surface region whose depth depends on a variety of parameters such as molecular size of reactant, nature and amount of cosolvent, reaction time and temperature. By determining the rate of diffusion and of reaction of a given reactant the depth of the modified region can accurately be predicted. Generally, a depth of up to about 10 percent of the thickness of the lens can be reacted. Excessive penetration may result in reduced oxygen permeability and should generally be avoided. Also, excessive penetration of the reaction may in some instances, unduly distort the lens parameters, e.g. shape. Preferably a depth of up to about 5 percent of the thickness is reacted.

In the following examples, wettability is determined by contact-angle measurements on the underside of samples immersed in distilled water, floating either an air bubble or a drop of n-octane to the lower surface. In these measurements a high contact angle corresponds to high wettability. In some cases wettability is denoted in terms of retraction time. We define the retraction time as follows: if a sample (40-×20-×1-mm) is vertically removed from water, the water film on the surface retracts (or beads up). The number of seconds elapsing until 90% of the surface is free of water is defined as the retraction time ($=t_R$). Low wettability would correspond to a $t_R$ of less than three seconds, preferably two seconds or less.

Synthesis of Polymer Substrates

The polymers listed in Table A are prepared by UV-initiated free-radical polymerization of vinylic monomers with a suitable dimethacrylate as crosslinking agent. The short-chain crosslinking agent is ethylene glycol dimethacrylate (EGDA); Polymeric crosslinking agents are either the trimethylacrylate (PSM) obtained by reacting 1 mol of a polydimethylsiloxane-triol of ~6000 MW (fluid 7248' from DOW CORNING) with 3 moles isophorone diisocyanate followed by capping with 2-hydroxyethyl methacrylate ($\equiv$PSM) or the dimethacrylate (PEM) obtained by reacting 1 mol of poly-n-butyleneoxide diol of ~2000 MW (Polymeg 2000, Wyandotte Chem. Corp.) with 2 moles isophorone diisocyanate followed by capping with 2-hydroxyethyl methacrylate.

EXAMPLE A 60 g PSM, 30 g methyl methacrylate (MMA) and 10 g glycidyl methacrylate (GMA) are mixed in a bottle together with 0.2% 1-hydroxycyclohexyl phenyl ketone (IRGACURE-184), a UV-initiator. The sample is degassed under nitrogen and filled into MYLAR lined glass molds (10-cm×10-cm) using 1-mm rubber cord or cut-out 0.1-mm MYLAR sheet spacers. The molds are irradiated by Black-Light Blue Sylvania lamps for 3 hours, after which time the sample is removed and extracted in absolute ethanol for two days. After drying the polymer can be used for surface modification.

The following examples show the effect of solvent on the yield of reaction and the results are summarized in Table 1.

EXAMPLE 1

Three sections (19-×7-×1-mm) of polymer 1 of combined weight of 0.3787 g ($5.33 \times 10^{-4}$ moles GMA) are stirred for 19 hours in a solution of 1.72 g: (0.016 moles) diethanolamine in 4.4 g absolute ethanol (final volume of 6 ml). Then the samples are washed by stirring in absolute ethanol (25 ml, 3×1 hr.). The samples are then dried in a vacuum oven at 70° C. for 2½ hours. From the weight of modified polymer (0.4108 g), the yield based on GMA is calculated to be 57%.

EXAMPLE 2

This example is performed in a similar fashion to that of example 1 except the solvent used is 70% ethanol/30% water (w/w). The final washing step (total of 4 washings) is followed by an additional wash in absolute ethanol before vacuum drying. The calculated yield based on GMA content is 24%.

The following table lists the compositions synthesized in the manner described above.

TABLE A

| Polymer Number | Composition % | | | | | | | | |
|---|---|---|---|---|---|---|---|---|---|
| | PEM | PSM | HEMA | DMA | MMA | EHA | BA | GMA | EGDA |
| 1 | | 50 | 10 | | 20 | | | 20 | |
| 2 | | 50 | 10 | | | 20 | | 20 | |
| 3 | | 60 | | | | 20 | | 20 | |
| 4 | 19 | — | | 60 | | | | 20 | 1 |
| 5 | 15 | — | | 60 | 25 | | | | |
| 6 | | | | | 39.5 | 39.5 | | 20 | 1 |
| 7 | | | | | 40 | 40 | | 20 | |
| 8 | | | | | 39.5 | | 39.5 | 20 | 1 |
| 9 | | | | | 40 | | 40 | 20 | |
| 10 | | | | | 79 | | | 20 | 1 |
| 11 | | | | | | | 79 | 20 | 1 |
| 12 | 50 | | | | 30 | | | 20 | |
| 13 | | 50 | | | 30 | | | 20 | |

HEMA: 2-hydroxyethyl methacrylate
MMA: methyl methacrylate
DMA: dimethyl acrylamide
EHA: 2-ethylhexyl acrylate
BA: butyl acrylate
GMA: glycidyl methacrylate
EGDA: ethylene glycol dimethacrylate

EXAMPLE 3

This example is performed in a similar fashion to that of Example 2 except the solvent used is 60% ethanol/40% aqueous buffer (pH 9). Since the concentration of buffer is 1% (potassium phosphate and sodium borate) and that of reactant approximately 3.4 Molar, the solvent behaves as 60% ethanol/40% water. The calculated yield based on GMA content is 10%.

EXAMPLE 4

This example is performed in a similar fashion to that of example 2 except the solvent used is deionized water. The washing step is 2×1 h water, 2×1 h 60% ethanol/40% water and then absolute ethanol. The calculated yield based on GMA content is 0%.

The results in Table 1 show that the yield of the reaction decreases as the percent of water in the reaction solvent increases. Since the samples swell to a greater extent in ethanol than in water (length of sample in ethanol, water and dry state is 2.1, 2.0 and 1.9 cm respectively) more epoxy groups would be exposed in ethanol and available for reaction with the amine. Also we note that as the reaction proceeds the modified samples swell to an even greater extent. For example, a dry sample 1.9 cm in length increases to 2.1 cm after swelling in absolute ethanol then after a reaction with diethanol amine in ethanol the length increases further to 2.5 cm. This can account for the yield dropping from ~60% when the reaction takes place in absolute ethanol to a negligible value when the reaction takes place in deionized water (or buffer, pH 9). Note that by stating the yield is zero means that the weight gained after the drying step is not detectable. A 0.1% yield, which would not be detected by our weighing procedure, can result in a depth of several thousand Angstoms having been modified. We also note from Table 1 that the introduction of the alcohol groups from diethanolamine increases the hydrophilicity of the material.

TABLE 1

Reaction of Polymer 1 with Diethanolamine[1] in Ethanol and Aqueous Ethanol

| Ex. | Solvent | Yield (%) | H$_2$O (%) |
|---|---|---|---|
| 1 | Absolute Ethanol[2] | 57 | 11.2 |
| 2 | 70% Ethanol 30% Water[3] | 24 | 8.1 |
| 3 | 60% Ethanol 40% Buffer (pH 9)[4] | 10 | 6.1 |
| 4 | Deionized Water[5] | 0 | 3.2 |

[1]30 molar excess of amine to epoxy groups.
[2]19 hours at room temperature in a volume of 6 ml.
[3]16½ hours at room temperature in a volume of 6 ml.
[4]16½ hours at room temperature in a volume of 5 ml.
[5]16½ hours at room temperature in a volume of 5 ml.

EXAMPLES 5-8

The following examples show the dramatically improved wettability of polymer 2 after treatment with amine and sulfite reactants in 15% ethanol/85% water. The reaction procedure used is essentially that mentioned earlier except the last washing step is not with ethanol but with deionized water. The contact angles are measured after approximately 7 days equilibration in water.

The monomer EHA is included in the polymer 2 composition to give the final product a soft, draping quality. In addition to rendering the final polymerized samples soft, the addition of EHA also leads to a material that is more hydrophobic. Thus in reaction solvents that contain a high proportion of water the polymerized sample swells to an even lower degree resulting in an even more surface specific reaction (i.e. less dept).

| Ex. | Reactant | Contact Angle Air/H$_2$O | Octane/Water |
|---|---|---|---|
| 5 | TRIS[1] | 168 | 167 |
| 6 | D-glucosamine[2] (pH 8) | 167 | 168 |
| 7 | Na$_2$SO$_3$[3] | 156 | 160 |
| 8 | —, control[4] | 146 | 142 |

[1]1.53 g TRIS in 10 g solvent (TRIS = Tris (hydroxymethyl)aminomethane).
[2]2.73 g D-Glucosamine.HCl in 10 g solvent, half-neutralized.
[3]1.6 g Na$_2$SO$_3$ in 18 g solvent.
[4]Polymer 2 in 10 g solvent without reactant.

The results in the above table indicate, in most cases, more than a 20° increase in contact angle. This wettability change can be observed more dramatically by eye. Water on the control sample beads up within seconds, but clings for several minutes on the reacted samples.

EXAMPLE 9-12

The following examples show an improved wettability of polymer 1 after treatment with amine and sulfite reactants in 15% ethanol/85% water. The reaction procedure is similar to that for example 5-8. In this case the replacement of EHA with MMA leads to a polymer that is a harder and stiffer material than polymer 2.

| Ex. | Reactant | Contact Angle Air/H$_2$O | Octane/Water |
|---|---|---|---|
| 9 | TRIS | 152 | 146 |
| 10 | D-Glucosamine (pH 8) | 148 | 139 |
| 11 | Na$_2$SO$_3$ | — | 147 |
| 12 | —, Control | — | 138 |

For this polymer the contact angle increase is significant but much less than that for the more flexible polymer 2.

EXAMPLES 13 AND 14

The following example with polymer 3 shows the high wettability of the siloxane macromer compositions after a posttreatment. reaction in 15% ethanol/85% water.

| Ex. | Reactant | Contact Angle Air/H$_2$O | Octane/Water |
|---|---|---|---|
| 13 | TRIS | 161 | 156 |
| 14 | —, Control | 144 | 141 |

EXAMPLE 15

The following example shows the wettability change as a function of reation time for polymer 3 reacted with TRIS in 15% ethanol/85% water. After the designated time, the sample is subjected to the washing procedure as stated in example 5.

| Reaction Time | Contact Angle Air/H$_2$O | Octane/H$_2$O |
|---|---|---|
| No Tris, Control | 146 | 142 |
| 10 min | 155 | 143 |
| 1.5 h | 159 | 159 |
| 17 h | 168 | 167 |

The results show that although at 10 minutes a 9° air/water contact angle change occurred, only a 1° change occurred in the octane/water angle. However a significant change is observed in both angles after 1.5 hours although still not of the same magnitude as that of an overnight reaction.

EXAMPLES 16-32

The following examples demonstrate the universality of the post-treatment reaction on non-silicone copolymers containing 20% GMA in 15% ethanol/85% water. In these materials the rigidity is increased with MMA and the flexibility increased with EHA. Also shown is that the presence of crosslinking agent does not disturb the effect of the reaction. The reaction procedure is similar to that of examples 5-8.

| Ex. | Polymer Number | Reactant | Air/H$_2$O | Octane/H$_2$O |
|---|---|---|---|---|
| 16 | 6 | TRIS | 143 | 130 |
| 17 | | Na$_2$SO$_3$ | 136 | 132 |
| 18 | | CONTROL | 121 | 102 |
| 19 | 7 | TRIS | 119 | 83 |
| 20 | | Na$_2$SO$_3$ | 140 | 136 |
| 21 | | CONTROL | 119 | 97 |
| 22 | 8 | TRIS | 128 | 118 |
| 23 | | Na$_2$SO$_3$ | 137 | 136 |
| 24 | | CONTROL | 113 | 97 |
| 25 | 9 | TRIS | 122 | 105 |
| 26 | | Na$_2$SO$_3$ | 115 | 106 |
| 27 | | CONTROL | 114 | 93 |
| 28 | 10 | TRIS | 120 | 111 |
| 29 | | Na$_2$SO$_3$ | 134 | 123 |
| 30 | | CONTROL | 111 | 95 |
| 31 | 11 | Na$_2$SO$_3$ | 142 | 139 |
| 32 | | CONTROL | 109 | 89 |

If one averages the contact angle increases on different copolymers one finds, for sodium silfite, a 17° air/water and 30° octane/water angle increase and for TRIS a 9° air/water and 7° octane/water angle increase over that of the unreacted control.

EXAMPLES 33-40

The following examples show that the effectiveness of the post-treatment on GMA containing SIMAC compositions extends to levels of GMA much less than 20%. The polymers 3a-3g are synthesized according to the procedure given in Ex. A by replacing GMA with MMA in polymer No. 3. The reaction procedure is similar to that in examples 5-8 using TRIS in 15% ethanol.

| | | | | Contact Angle | | | |
|---|---|---|---|---|---|---|---|
| | | | | Treated | | Untreated Control | |
| Ex. | Pol. # | MMA % | GMA (%) | Air/H$_2$O | Octane/H$_2$O | Air/H$_2$O | Octane/H$_2$O |
| 33 | 3 | — | 20 | 158 | 154 | 147 | 142 |
| 34 | 3a | 5 | 15 | 158 | 154 | 143 | 131 |
| 35 | 3b | 10 | 10 | 157 | 154 | 147 | 139 |
| 36 | 3c | 15 | 5 | 154 | 152 | 144 | 136 |
| 37 | 3d | 17.5 | 2.5 | 160 | 152 | — | — |
| 38 | 3e | 19 | 1 | 153 | 151 | — | — |
| 39 | 3f | 19.5 | 0.5 | 151 | 147 | — | — |
| 40 | 3g | 20 | — | 147 | 141 | 144 | 141 |

EXAMPLES 41-43

The following examples show that the effectiveness of the Posttreatment on GMA containing non-silicone copolymers covers a wide range of GMA content. Polymers 6a and 6b are synthesized according to the procedure given in Ex. A by replacing GMA with MMA. Also synthesized is a homopolymer of GMA, crosslinked with 1% EGDA (Pol.6c). In these cases a lowering of GMA content is balanced by an increase in MMA content. The reaction procedure is similar to that noted in examples 5-8 this time using TRIS in 15% ethanol.

| | | | | Contact Angle | | | |
|---|---|---|---|---|---|---|---|
| | | MMA | GMA | Treated | | Untreated | |
| Ex. | Pol. | (%) | (%) | Air/H$_2$O | Octane/H$_2$O | Air/H$_2$O | Octane/H$_2$O |
| 41 | 6a | 54.5 | 5 | 151 | 134 | 134 | 117 |
| 42 | 6b | 49.5 | 10 | 160 | 143 | 135 | 127 |
| 43 | 6c | — | 99 + 1% EGDA | 143 | 131 | 127 | 112 |

The results show an approximately 17° octane/H$_2$O contact angle increase after reaction with TRIS over that of the unreacted control.

EXAMPLES 44-47

The following examples show the effectiveness of the posttreatment in 15% ethanol, on polymer 3 with a variety of primary amines. The reaction procedure is similar to that noted in examples 5-8.

| | | | Contact Angle | |
|---|---|---|---|---|
| Ex. | Reactant | $t_R{}^a$ | Air/H$_2$O | Octane/H$_2$O |
| 44 | H$_2$NCH$_2$CH$_2$OH | 64 | 157 | 152 |
| 45 | H$_2$NC(CH$_3$)$_2$CH$_2$OH | >120 | 154 | 151 |
| 46 | H$_2$NC(CH$_2$OH)$_3$ | >120 | 155 | 152 |
| 47 | Polymer 3 Control | 1 | 141 | 134 |

$^a t_R$ = retraction time in seconds evaluated 4 days after reaction with amine.

The results show a dramatic improvement in wettability using primary amines containing the hydrophilic hydroxyl function.

EXAMPLES 48-55

The following examples show the effectiveness of the posttreatment in 15% ethanol on polymer 3 with a variety of secondary amines. The reaction procedure is similar to that noted in examples 5-8.

| Ex. | Reactant | $t_R$, s | Contact Angle Air/H$_2$O | Contact Angle Octane/H$_2$O |
|---|---|---|---|---|
| 48 | HN[CH(CH$_3$)$_2$]$_2$ | 5 | 154 | 150 |
| 49 | HN[CH$_2$CH(OH)CH$_3$]$_2$ | 4 | 155 | 152 |
| 50 | (HOCH$_2$)$_3$CNH(CH$_2$)$_3$NHC(CH$_2$OH)$_3$ | 3 | 154 | 150 |
| 51 | HN(CH$_3$)CH$_2$[CH(OH)]$_4$CH$_2$OH | 30 | 155 | 144 |
| 52 | HN(CH$_3$)CH$_2$CH$_2$SO$_3$Na | ~100 | 148 | 146 |
| 53 | HNCH$_2$CH$_2$OCH$_2$CH$_2$ (ring) | 10 | 157 | 153 |
| 54 | HN(CH$_3$)CH$_2$COOH | ~100 | 153 | 150 |
| 55 | (HOCH$_2$)$_3$CNHCH$_2$COOH | 3 | 150 | 147 |
| 47 | —, Control | 1 | 141 | 134 |

$t_R$ = retraction time

The results show that even a hydrophobic amine (Ex. 48) can lead to a wettability increase presumably because the hydroxyl group produced on opening the epoxy ring counteracts the hydrophobic methyl groups. Examples 52 and 54 point out that ionic groups strongly affect the retraction time.

EXAMPLES 56–59

The following examples show the effectiveness of the posttreatment in 15% ethanol on polymer 3 with a variety of mercaptans. The reacton procedure is similar to that noted in examples 5–8 except that the solutions are 10% in mercaptan and 1 M in NaOH. The final pH of the resultant solution is indicated in the Table below.

| Ex. | Reactant | pH | $t_R$,s | Contact Angle Air/H$_2$O | Contact Angle Octane/H$_2$O |
|---|---|---|---|---|---|
| 56 | HSCH$_2$CH$_2$OH | 10 | 28 | 158 | 154 |
| 57 | HSCH$_2$CH(OH)CH$_2$OH | 10 | 58 | 156 | 153 |
| 58 | HSCH$_2$COOH | 5.5 | 31 | 156 | 152 |
| 59 | O—HSC$_6$H$_4$COOH | 7.6 | >100 | 157 | 153 |
| 47 | —, Control | — | 1 | 141 | 134 |

$t_R$ = retraction time

The results are similar to the secondary amine examples in that ionic groups (Ex. 59) lead to especially long retraction times.

Other Evidence of Reactions on Epoxy Containing Polymers

We use two methods to more fully characterize the reaction of GMA containing polymers with various reactants in 15% ethanol i.e. (A) infrared absorption changes and (B) tinting.

(A) In this method we find it necessary to use thin (0.1-mm) films of a polymer that swell in this solvent and then monitor the decrease of the infrared absorption bands, corresponding to the epoxy group, signaling its reaction. The bands monitored using polymer 5 are 850 and 910 cm$^{-1}$.

(B) A novel way of providing evidence for the posttreatment reaction is by dyeing thick (1-mm) films with fluoresceinamine. The amino group of this dye reacts with epoxy groups and therefore films still containing epoxy groups are tintable. The posttreated films are placed in a 0.04% solution of fluoresceinamine, pH≈12. The films are then extracted overnight in methanol and then further extracted by soxhlet extraction (25 hours in absolute ethanol).

EXAMPLE 60–63

The following examples show the effectiveness of the posttreatment in 15% ethanol on polymer 3 with thiourea, a hydrazide and thiosulfate. The reaction procedure is similar to that noted in Examples 5–8 except that the solutions are 1.5 g of reactant in 15 g solvent.

| Ex. | Reactant | Contact Angle Air/H$_2$O | Contact Angle Octane/H$_2$O |
|---|---|---|---|
| 60 | H$_2$N—C(=S)—NH$_2$ | 147 | 143 |
| 61 | H$_2$N—NH—CO—$\overset{+}{N}$(CH$_3$)$_3$Cl$^-$ | 149 | 144 |
| 62 | Na$_2$S$_2$O$_3$ | 151 | 144 |
| 63 | Control, no reactant | 142 | 139 |

The results show an improvement in wettability over that of the untreated control.

EXAMPLE 64–68

The following examples show reactions on polymer 4 using a hydrophilic primary amine and secondary amine. Where a reaction occurs (by disappearance of epoxy bands) tinting fails and where a reaction fails (by non-disappearance of epoxy bands) tinting occurs. Included is a control polymer (Polymer 5) that does not contain epoxy groups (Ex. 68).

| Example | Reactant | I.R. | Intensity of Fluoresceinamine Emission[a] |
|---|---|---|---|
| 64 | H$_2$NCH$_2$CH$_2$OH | + | 1 |
| 65 | N—methyl-D-glucamine | + | 1 |
| 66 | Tricine | — | 6 |
| 67 | no reactant | — | 6 |
| 68 | Control, no epoxy | | 1 |

+ = reacted, — = unreacted
1 = colorless, 8 = deep colored
[a]Intensity determined while sample illuminated with lamp of 360-nm emission maximum.

The results show that simple primary and secondary amines react but a hindered amine such as tricine fails to react. The control example (No. 68) shows that the amino dye is not absorbed strongly by non-covalent action and that non-epoxy sites in the polymer are not reactive to the amine.

EXAMPLES 69-71

The following examples demonstrate the tintability by reactive dyes of posttreated polymers.

EXAMPLE 69

A sample of polymer 3 and of polymer 3 treated with 1-thioglycerol according to the procedure described in example 57 (~1-mm thick) are soaked for one half hour in 4 ml of 10% $Na_2CO_3$ pH 11.6 and then 0.1 ml of dyestuff stock solution (0.1 g Royal Blue in 10 ml of 1 mM HCl) is added. The samples are kept overnight in the dyestuff solution, rinsed in buffer pH 7.4 (50 mM potassium phosphate) and extracted for 24 h in 20 ml of methanol. The blue color of the thioglycerol treated sample does not change on subjecting the sample to soxhlet extraction (66 hours, distilled water), whereas the control becomes completely colorless.

The following example describes the tinting with Royal Blue of Polymer 4 which has been treated with diisopropanolamine in a procedure described in example 49.

EXAMPLE 70

The tinting procedure is the same as that described in Example 69.

The resultant blue color is of deeper intensity than that described in example 69.

The following example describes the tinting with Brilliant Yellow G of polymer 4 which has been treated with TRIS in aqueous solution in a procedure described in example 5.

EXAMPLE 71

The dyestuff stock solution contains 0.1 g of dye in 10 ml of 1 mM HCl. The tinting procedure (using a 0.1-mm film) is similar to that described in example 69 except the wash procedure is completed with the methanol extraction.

The resultant tint is a deep yellow color.

EXAMPLE 72-73

The following examples show the depth of modification as a function of reactant, solvent, temperature or time.

EXAMPLE 72

This example shows a time course of reaction of an $R_f$-thiol (i.e. $C_8F_{17}C_2H_4SH$) with the epoxy groups of a dry sample of polymer 15.

The solution, composed of 94 g $R_fSH$, 12 g triethylamine and 114 g absolute ethanol is maintained at 48° C. Dry samples with dimensions $15\times15\times1$ mm are placed in the solution and at specified times removed and immediately extracted in 300 g of absolute ethanol (maintained at 50° C.) for at least 4 hours with a minimum of one change of fresh ethanol. The samples are dried overnight in vacuo at 80°. From the weight gained the yield of reaction is calculated. An SEM-electron microprobe scan for sulfur reveals the depth of the modification as well as the reaction yield. The following table compares the yield calculated from the weight gain and the line scan.

| Reaction Time (h) | Modification | |
|---|---|---|
| | % of cross-section by SEM - Line Scan | % by Weight |
| 1 | 27 | 22 |
| 2 | 53 | 42 |
| 3 | 69 | 62 |
| 6 | 100 | 100 |
| 19½ | 100 | 100 |

The results show that the weight gain is restricted to a small penetration depth and that even after prolonged reaction time no other functional group (i.e. non-epoxy) on the polymer react. The scans are rectangular in shape suggesting that the modification is diffusion controlled.

EXAMPLE 73

This example shows the yield of reaction of an 18 hour post-treatment treatment on polymer 12 with 1-thioglycerol under varying solvent and temperature conditions.

The solutions used are 0.3 M thioglycerol in aqueous ethanol containing sodium hydroxide to ensure all thiols existed as the thiolate anion. For example to make a solution in 45% ethanol, 0.5 g 1-thioglycerol is dissolved in 4.16 g 1N NaOH, 3.74 ml water and 8.1 g absolute ethanol. Dry samples (15-x15-x1-mm)are placed in the solutions overnight. They are then extracted in ~20 ml of the same solvent composition for ~5 hours with three changes of fresh solvent and dried overnight in vacuo at 80°. From the weight gain and SEM line scan the yield of reaction is determined and presented in the Table shown below.

| Temperature, °C. | % EtOH | Modification | |
|---|---|---|---|
| | | % of cross-section by SEM - Line Scan | % by Weight |
| 25 | 15 | 0 | 0 |
| 25 | 45 | 10 | 15 |
| 25 | 70 | 32 | 33 |
| 50 | 15 | 0 | 0 |
| 50 | 45 | 32 | 29 |
| 50 | 70 | 69 | 57 |

The results shoe that the yield increases as the temperature is raised and the solvent swelling power (i.e. increased ethanol content) is increased. The modification proceeds as a sharply moving boundary from the surface into the interior of the polymer.

The following examples demonstrate the effect of posttreatment on protein adsorption.

EXAMPLE 74-80

The protein of choice is albumin because of its abundance in body fluids. A 20-x15-x1-mm sample of polymer 12 or 13 is immersed in 1.8 ml of a $^{14}C$-albumin cocktail (10 mM potassium phosphate buffer pH 7.4, 144 mM NaCl, 0.48 mg/ml 'cold' bovine serum albumin, 0.02 mg/ml $^{14}C$-bovine serum albumin) for 2 hours at room temperature. The sample is then removed from the cocktail and then subjected to four sequential rinses of 15 ml of water to remove adhering droplets of cocktail. The sample is then stirred in 10 ml 0.1 M Tris-Cl pH 7 containing 1% octylphenoxy polyethoxy ethanol (Triton X-100) for 2 hours at room temperature to elute uncrosslinked but adsorbed protein and then rinsed in 15 ml water. Protein bound to the polymer (after Triton wash) is determined by scintillation counting (15 ml Packard Instagel). The amount of protein eluted by Triton is determined from a 1-ml (10%) sample of the Triton wash counted in 15 ml of Instagel. The total protein bound to the polymer (i.e. after the original 4 water rinses) is the sum of the counts on the polymer after the Triton wash and the counts removed in the Triton wash.

| Ex. | Polymer | Reactant | Counts Above Background (cpm) | |
|---|---|---|---|---|
| | | | Total | On Polymer After Triton Wash |
| 74 | 12 | 1-thioglycerol | 378 | 78 |
| 75 | 12 | sarcosine | 569 | 160 |
| 76 | 12 | Na2SO3 | 487 | 177 |
| 77 | 12 | TRIS | 1150 | 630 |
| 78 | 12 | —, Control | 1314 | 974 |
| 79 | 13 | mercaptoethanol | 1220 | 530 |
| 80 | 13 | —, Control | 1556 | 956 |

The examples shown above indicate dramatic changes in albumin adsorption and desorption (using Triton X-100) of treated samples compared to untreated control samples. The treatments on the above polymers inhibit protein adsorption and facilitate its removal with a nonionic surfactant.

EXAMPLE 81

The example shows an improvement in wettability of a polymer sheet (PSM=25%, GMA=15%, neopentyl glycol dimethacrylate=16%, isobornyl methacrylate=44%, prepared as in Example A) after room temperature treatment with an alcohol, polyvinyl alcohol (PVA), and a further improvement in this wettability with the crosslinking of this surface-bound PVA with 1,4-butanediol diglycidyl ether (BUDGE). Where indicated in the reaction sequence below, 2 g of aqueous 10% (w/w) PVA (Elvanol 71-30, DuPont), 3.17 g 10% (w/w) aqueous NaOH or 0.51 g BUDGE is added to the reaction bottle that contains the polymer sheet. The duration of the PVA, NaOH and BUDGE steps are 1 day, 2¼ hours and 2 hours respectively. Exhaustive water washes follow the treatments. The H2O only (control) bottle is filled with H2O at the beginning of the experiment.

Retraction times are measured one week after the reaction.

| Reaction Sequence | Retraction Time, $t_R$ s |
|---|---|
| (a) PVA → NaOH → BUDGE | 42 |
| (b) PVA → NaOH | 23 |
| (c) H2O only (control) | <1 |

What is claimed is:

1. A contact lens possessing a wettable surface in its aqueous environment of use fabricated from a hydrophobic addition polymer incorporating between about 0.5 and about 30 percent by weight oxirane substituted units in the backbone thereof, wherein the outer surfaces of said lens contain an amount sufficient to increase the contact angle by at least 5°, of a reaction product of said oxirane substituted units of the formula:

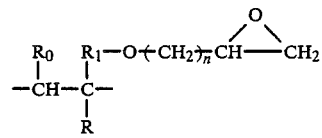 (I)

wherein
R is hydrogen or methyl;
$R_1$ is

or lower alkylene;
n is 1 to 4; and
$R_o$ is hydrogen or

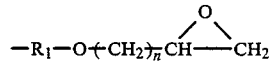

with a water soluble amine, alcohol, thiol, urea or thiourea, or a sulfite, bisulfite or thiosulfate.

2. A contact lens according to claim 1, wherein the contact angle is increased by at least 10°.

3. A contact lens according to claim 2, wherein the contact angle is increased by at least 15°.

4. A contact lens according to claim 1, wherein the reaction product is a reaction product between said oxirane and a water soluble aliphatic, cycloaliphatic or aromatic primary or secondary amine having up to 12 carbon atoms.

5. A contact lens according to claim 1, wherein the reaction product is a reaction product between said oxirane and a water soluble pharmaceutically acceptable salt of a sulfite, bisulfite or thiosulfate.

6. A contact lens according to claim 1, wherein the hydrophobic polymer has a contact angle less than about 150°.

7. A contact lens according to claim 6, wherein said contact angle is less than 145°.

8. A contact lens according to claim 1, wherein the contact lens material is a silicone containing copolymer.

9. A contact lens according to claim 1 wherein the reaction product is prepared by conducting the reaction in aqueous medium at a PH between 3 and 10 and a temperature between 0 and 100° C. for a period of time sufficient such that the surface region of the lens, up to 10 percent of the thickness thereof is reacted to form reaction product.

* * * * *